US012780055B2

(12) United States Patent
Cho et al.

(10) Patent No.: US 12,780,055 B2
(45) Date of Patent: Nov. 3, 2026

(54) ROTATING SEAT

(71) Applicant: HYUNDAI TRANSYS INC., Seosan-si (KR)

(72) Inventors: Jae Hoon Cho, Hwaseong-si (KR); Hae Dong Kwak, Hwaseong-si (KR); Hyeon Jae Kim, Hwaseong-si (KR); Han Kyung Park, Hwaseong-si (KR); Won Young Lee, Hwaseong-si (KR); Sin Jeong Kang, Hwaseong-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 107 days.

(21) Appl. No.: 18/907,605

(22) Filed: Oct. 7, 2024

(65) Prior Publication Data

US 2025/0214489 A1 Jul. 3, 2025

(30) Foreign Application Priority Data

Dec. 27, 2023 (KR) ........................ 10-2023-0193448

(51) Int. Cl.
*B60N 2/14* (2006.01)

(52) U.S. Cl.
CPC .................................... *B60N 2/146* (2013.01)

(58) Field of Classification Search
CPC ...................................................... B60N 2/146
USPC ....... 297/344.22, 344.21, 344.33; 248/349.1; 108/142
See application file for complete search history.

(56) References Cited

U.S. PATENT DOCUMENTS

| | | | | | |
|---|---|---|---|---|---|
| 3,860,283 | A * | 1/1975 | Colautti | B60N 2/146 | 297/344.22 |
| 5,042,864 | A * | 8/1991 | Mochizuki | B60N 2/14 | 248/416 |
| 5,951,106 | A * | 9/1999 | Hirama | B60N 2/146 | 297/344.22 |
| 7,648,186 | B2 * | 1/2010 | Ukai | B60N 2/146 | 297/344.22 |
| 10,807,504 | B2 | 10/2020 | Line et al. | | |
| 2007/0246987 | A1 * | 10/2007 | Sano | B60N 2/146 | 297/344.21 |
| 2010/0102611 | A1 * | 4/2010 | Bunea | B60N 2/146 | 297/344.22 |

(Continued)

OTHER PUBLICATIONS

Extended search report dated Apr. 3, 2025 from European Patent Application No. 24206355.0-1009.

*Primary Examiner* — Jose V Chen
(74) *Attorney, Agent, or Firm* — Quantum Patent Law Firm; Seongyoune Kang

(57) ABSTRACT

A vehicular rotatable seat may include locking pins each extending in a longitudinal direction, an inner plate configured to allow the seat to be coupled to an outer side thereof, the inner plate accommodating the locking pins on an inner side thereof, and an outer plate configured to rotatably accommodate the inner plate on an inner side thereof, wherein the outer plate has a plurality of locking pin fixing grooves respectively formed in a plurality of locations thereof and configured to fix the locking pins, wherein one end of each of the locking pins is inserted into a corresponding one of the locking pin fixing grooves, and the locking pins are selectively inserted, by rotation of the inner plate, into a part of the plurality of locking pin fixing grooves.

16 Claims, 10 Drawing Sheets

(56) References Cited

U.S. PATENT DOCUMENTS

| | | | | |
|---|---|---|---|---|
| 2014/0217796 | A1* | 8/2014 | Haller | B60N 2/146<br>297/344.26 |
| 2020/0101871 | A1* | 4/2020 | Garotte | B60N 2/06 |
| 2020/0384897 | A1* | 12/2020 | Rogg | B60N 2/08 |
| 2021/0221260 | A1* | 7/2021 | Hong | B60N 2/1685 |
| 2023/0139845 | A1* | 5/2023 | Kim | B60N 2/02253<br>296/65.18 |
| 2023/0286419 | A1* | 9/2023 | Mclaughlin | B60N 2/02246 |
| 2024/0227633 | A1* | 7/2024 | Park | B60N 2/14 |
| 2024/0278694 | A1* | 8/2024 | Kang | B60N 2/146 |
| 2024/0351484 | A1* | 10/2024 | Kim | G01D 5/04 |

* cited by examiner

ROTATING SEAT

CROSS-REFERENCE TO RELATED APPLICATION

This application claims, under 35 U.S.C. § 119 (a), priority to Korean Patent Application No. 10-2023-0193448, filed on Dec. 27, 2023 and the entire contents of which are incorporated herein by reference.

BACKGROUND

(a) Technical Field

The present disclosure relates to a rotating seat.

(b) Background Art

Recently, research and develop has been actively conducted on autonomous driving of vehicles with development of data communication, processing, and sensor technology. With development of autonomous driving technology, a vehicle may be transformed from a simple means of transportation into one communal space capable of performing various functions.

For example, while autonomous driving is performed, a passenger may watch a movie in the vehicle. Further, artwork may be displayed in the vehicle, or a vehicle may function as a café in which passengers in the vehicle may freely talk to each other.

Particularly, in order to perform the above-described functions, it is required to develop a built-in seat configured to be freely movable in the vehicle, to provide various adjustable seating positions, and to be freely rotatable.

In general, a vehicle seat has a function of providing convenience to a passenger and stably holding a passenger when the vehicle is travelling. Particularly, in the event of vehicle collision, a vehicle seat needs to be stably and firmly coupled to a vehicle body and a vehicle floor so as to ensure the safety of a passenger.

Therefore, in the case of a rotatable seat as well, rotation of the rotatable seat needs to be controlled by locking and unlocking functions provided in the seat. Further, in the locked state of the rotatable seat, it is necessary to secure sufficient coupling rigidity between the vehicle body and the rotatable seat.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to solve the above-described problems associated with the prior art, and it is an object of the present disclosure to provide a rotating seat configured to be rotatable in a vehicle.

In one aspect, the present disclosure provides a rotating seat including locking pins each extending in a longitudinal direction, an inner plate configured to allow the seat to be coupled to an outer side thereof, the inner plate accommodating the locking pins on an inner side thereof, and an outer plate configured to rotatably accommodate the inner plate on an inner side thereof, wherein the outer plate has a plurality of locking pin fixing grooves respectively formed in a plurality of locations thereof and configured to fix the locking pins, wherein one end of each of the locking pins is inserted into a corresponding one of the locking pin fixing grooves, and the locking pins are selectively inserted, by rotation of the inner plate, into a part of the plurality of locking pin fixing grooves.

In a preferred embodiment, the inner plate may have a pair of the locking pins accommodated on the inner side thereof and disposed to face each other on the same line.

In another preferred embodiment, the locking pins may have first guide protrusions respectively formed on upper surfaces thereof and formed to protrude outwards from the inner plate, and the inner plate may have a locking pin bracket accommodation groove formed on an outer side thereof and configured to accommodate a locking pin bracket having slot holes each formed therein and configured to allow a corresponding one of the first guide protrusions of the locking pins to be movably accommodated therein.

In still another preferred embodiment, the locking pin bracket may have a lever plate provided at an upper portion thereof, wherein the lever plate may be connected to the locking pin bracket and the inner plate and may be configured to separate, by release force, the one end of each of the locking pins from the corresponding one of the locking pin fixing grooves.

In yet another preferred embodiment, each of the first guide protrusions of the locking pins may be moved, when the lever plate is rotated by the release force, toward an inner side of the locking pin bracket along a corresponding one of the slot holes, and the one end of each of the locking pins may be separated from the corresponding one of the locking pin fixing grooves.

In still yet another preferred embodiment, the seat coupled to the inner plate may enter a rotatable state when the one end of each of the locking pins is separated from the corresponding one of the locking pin fixing grooves by the release force applied to the lever plate.

In a further preferred embodiment, the inner plate connected to the seat may be rotated when the seat is rotated by applying rotational force to the seat.

In another further preferred embodiment, each of the lever plate and the inner plate may have a spring coupling protrusion formed on an upper surface thereof and coupled to a torsion spring, and the lever plate and the inner plate may be connected to each other through the torsion spring.

In still another further preferred embodiment, the locking pin bracket may have a first coupling hole formed therein, and the lever plate may have a second coupling hole formed therein at a position corresponding to the first coupling hole, wherein the first coupling hole and the second coupling hole may have a connector inserted thereinto and configured to connect the locking pin bracket to the lever plate.

In yet another further preferred embodiment, the locking pins may have second guide protrusions respectively provided on lower surfaces thereof and formed to protrude downwards, and the inner plate may have a base plate provided at a lower portion thereof, wherein the base plate may have a guide portion formed thereon and configured to contact the second guide protrusions so as to move the second guide protrusions.

In still yet another further preferred embodiment, each of the second guide protrusions may be moved, when rotational force is applied to the seat after the one end of each of the locking pins is separated from the corresponding one of the locking pin fixing grooves, along an outer peripheral surface of the guide portion, thereby moving each of the locking pins.

In a still further preferred embodiment, the inner plate and a lever plate may be connected to each other through a torsion spring, the locking pin bracket may be connected to the inner plate, a position of the torsion spring may vary depending on rotation of the lever plate and the inner plate, and a direction of force acting on each of the locking pins may be changed depending on the position of the torsion spring.

In a yet still further preferred embodiment, a pair of the slot holes may be formed in a streamlined shape.

In a yet preferred embodiment, the inner plate may have locking pin accommodation grooves formed therein and configured to allow the locking pins to be accommodated on the inner side of the inner plate, wherein each of the locking pin accommodation grooves may serve as a reciprocating motion path of a corresponding one of the locking pins.

In a yet further preferred embodiment, the outer plate may have an inner plate accommodation space formed therein and configured to accommodate the inner plate, thereby accommodating the inner plate on the inner side of the outer plate.

In yet another further preferred embodiment, the locking pin fixing grooves may be formed at equal intervals along a circumference of the outer plate.

Other aspects and preferred embodiments of the disclosure are discussed infra.

It is understood that the terms "vehicle", "vehicular", and other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, vehicles powered by both gasoline and electricity. The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIGS. 4 and 5 are diagrams each showing an inner plate and a locking pin accommodated in the inner plate, in which FIG. 4 is a diagram showing the upper surface of the inner plate, and FIG. 5 is a diagram showing the lower surface of the inner plate;

Figure 1:
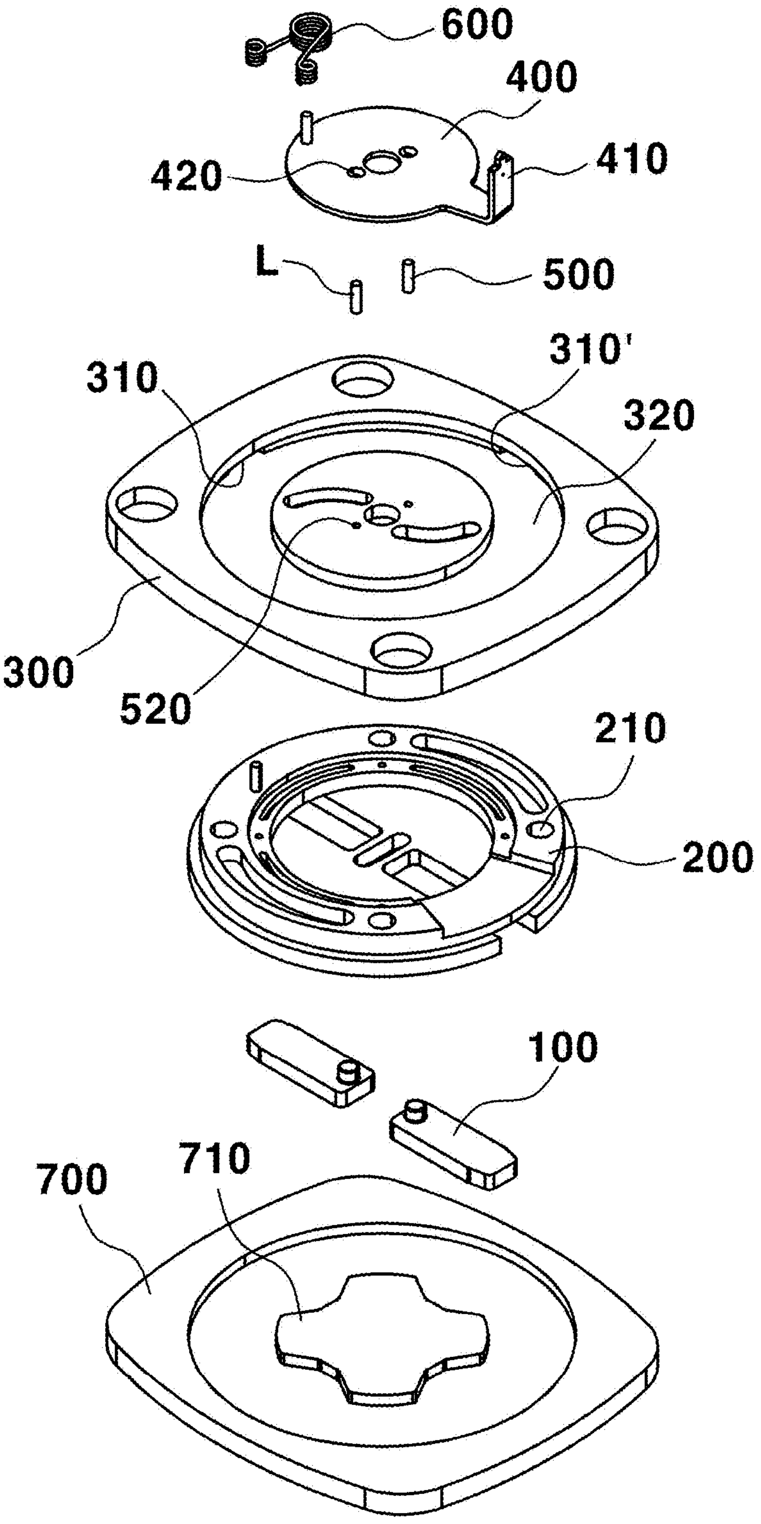
FIG. 1 is an exploded view of a rotating seat according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, the present disclosure will be described in detail through preferred embodiments thereof with reference to the accompanying drawings. Wherever possible, the same reference numbers will be used throughout the drawings to refer to the same or like parts, and redundant descriptions thereof will be omitted.

In describing the embodiments disclosed herein, when it is determined that a detailed description of publicly known techniques to which the disclosure pertains may obscure the gist of the present disclosure, the detailed description will be omitted. Further, it should be understood that the accompanying drawings are merely illustrated to easily describe the embodiments disclosed in this specification, and therefore, the technical idea disclosed in this specification is not limited by the accompanying drawings. Further, it should be noted that the accompanying drawings include all modifications, equivalents, and substitutes that fall within the spirit and technical scope of the present disclosure.

Meanwhile, in the present disclosure, terms such as "first" and/or "second" may be used to describe various components, but the components are not limited by the terms. The terms are used only for the purpose of distinguishing one component from other components.

In this specification, an expression in a singular form also includes the plural sense, unless clearly specified otherwise in context.

It should be understood that expressions such as "comprise" and "have" in this specification are intended to designate the presence of indicated features, numbers, steps, operations, components, parts, or combinations thereof, but do not exclude the presence or addition of one or more features, numbers, steps, operations, components, parts, or combinations thereof.

Hereinafter, the suffixes "module", "unit", and "part" for components used in the following description are merely provided for facilitation of preparing this specification. Therefore, the suffixes themselves do not have significant meanings or roles.

When one component is referred to as being "connected" or "joined" to another component, the one component may be directly connected or joined to the other component, but it should be understood that other components may be present therebetween. On the other hand, when the one component is referred to as being "directly connected to" or "directly in contact with" the other component, it should be understood that no other components are present therebetween.

Figure 2:
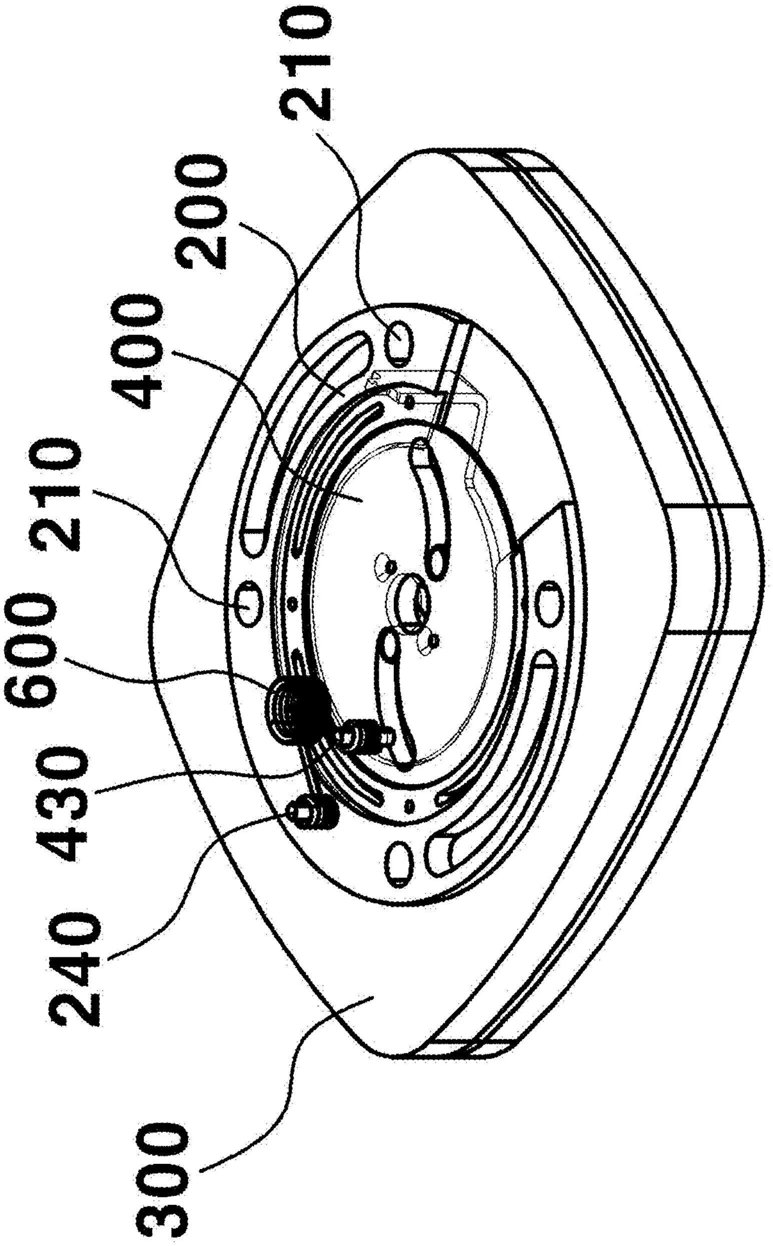
FIG. 2 is a diagram showing a coupled state of the rotating seat according to the embodiment of the present disclosure.
Figure 3:
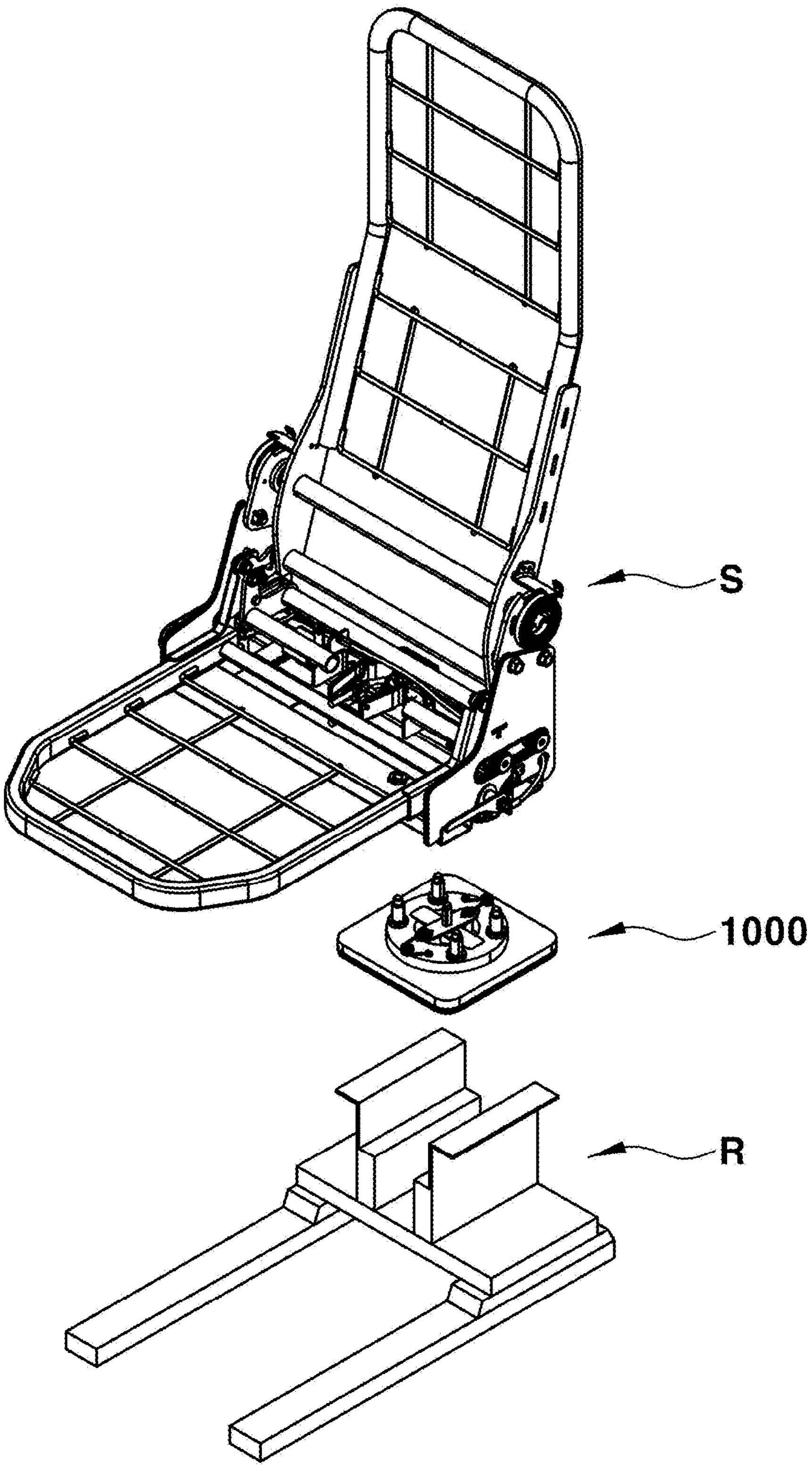
FIG. 3 is a diagram showing an example in which the rotating seat is applied to a vehicle.

FIG. 1 is an exploded view of a rotating seat according to an embodiment of the present disclosure, FIG. 2 is a diagram showing a coupled state of the rotating seat according to the embodiment of the present disclosure, and FIG. 3 is a diagram showing an example in which the rotating seat is applied to a vehicle.

Referring to FIGS. 1 to 3, the rotating seat according to the embodiment of the present disclosure includes locking pins 100 each extending in the longitudinal direction, an inner plate 200 configured to allow the seat to be coupled to the outer side thereof and to accommodate the locking pins 100 on the inner side thereof, and an outer plate 300 configured to rotatably accommodate the inner plate 200 on the inner side thereof, in which the outer plate 300 has a plurality of locking pin fixing grooves 310 and 310' respectively formed in a plurality of locations thereof and configured to fix the locking pins 100, one end of each of the locking pins 100 is inserted into a corresponding one of the locking pin fixing grooves, and the locking pins 100 are selectively inserted into a part of the plurality of locking pin fixing grooves 310 and 310' by rotation of the inner plate 200.

The seat of the present disclosure has a function of rotating in the interior space of the vehicle. The seat is rotatable when necessary so as to allow a passenger to sit in the desired direction. Simultaneously, the seat is prevented from rotating from the desired position of the passenger after rotation thereof. Since it is necessary to reliably secure the safety of a passenger against vehicle collision while a vehicle is constantly travelling, rotation of the seat needs to be prevented while a vehicle is travelling.

To this end, the present disclosure may provide a device capable of rotating the seat relative to a vehicle body floor or a rail provided on the vehicle body floor.

Specifically, a seat S may be coupled to the outer side of the inner plate 200. The inner plate 200 has a seat coupling hole 210 formed in one surface thereof and configured to allow the seat S to be coupled thereto. In this manner, when any one of the seat S and the inner plate 200 is rotated, the other component may also be rotated. One surface of the inner plate 200 may be a surface facing the seat S.

The inner plate 200 may be made of metal or plastic and may be formed by injection molding. Since the inner plate 200 is coupled to the vehicle seat, the inner plate 200 is preferably made of a material having sufficient rigidity.

Meanwhile, referring to FIG. 3, a rotating seat 1000 including the inner plate 200 is coupled to a seat rail R provided on the vehicle floor or is directly coupled to the vehicle floor, thereby providing the rotating seat 1000 in the vehicle.

As described above, the rotating seat is mounted on the seat rail provided in the vehicle, thereby making it possible not only to enable free movement and free rotation of the seat, but also to provide a vehicular seat capable of assuming various positions in the vehicle.

Figure 4:
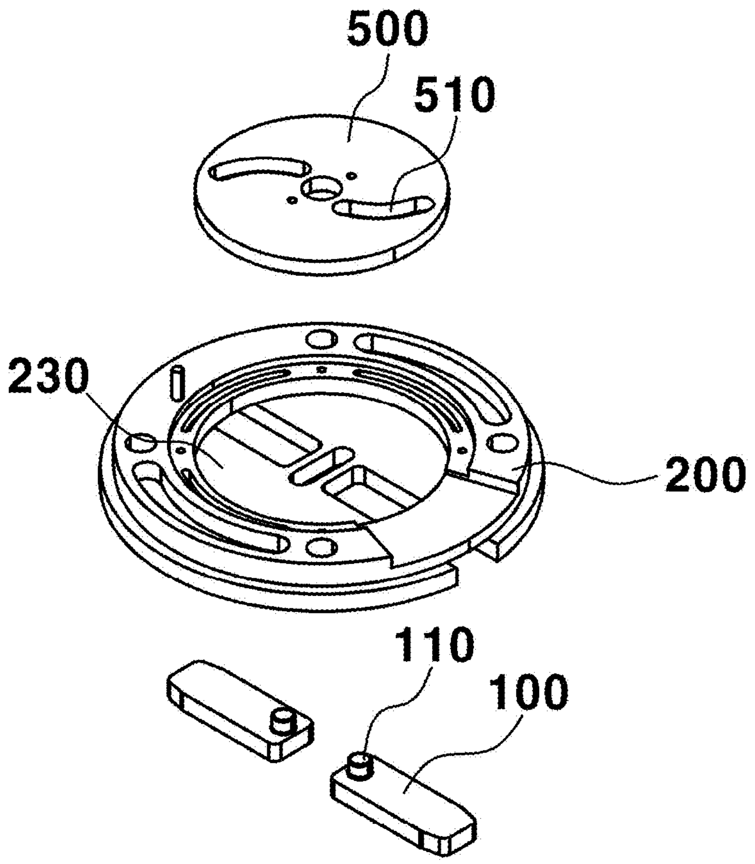
Figure 5:
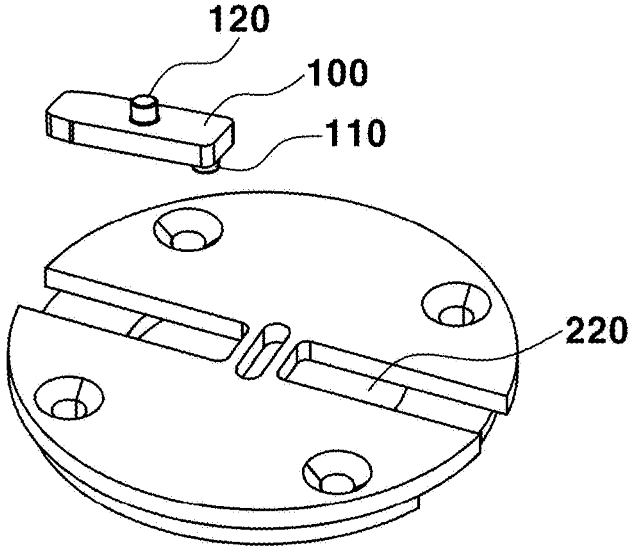

FIGS. 4 and 5 are diagrams each showing the inner plate and the locking pin accommodated in the inner plate. Here, FIG. 4 is a diagram showing the upper surface of the inner plate, and FIG. 5 is a diagram showing the lower surface of the inner plate.

The locking pin 100 is accommodated in the inner plate 200. The locking pin 100 performs linear reciprocating motion in the inner plate 200. The inner plate 200 has a locking pin accommodation groove 220 formed therein and configured to allow the locking pin 100 to be accommodated on the inner side of the inner plate 200. The locking pin 100 is accommodated in the locking pin accommodation groove 220 so as to enable linear reciprocating motion thereof therein. That is, the locking pin accommodation groove 220 serves as a reciprocating motion path of the locking pin 100.

Accordingly, when one end of the locking pin 100 is inserted into the locking pin fixing groove 310 of the outer plate 300, the inner plate 200 is fixed. When one end of the locking pin 100 is separated from the locking pin fixing groove 310, the inner plate 200 becomes rotatable.

The locking pin serves to fix the inner plate to the outer plate so as to prevent rotation of the inner plate. Here, in a state in which the locking pin is inserted into the locking pin fixing groove of the outer plate, the locking pin needs to be prevented from being separated from the locking pin fixing groove due to external impact. Further, the locking pin may be made of metal or plastic so as to ensure sufficient rigidity, thereby preventing the locking pin from being cut in a state in which the locking pin is inserted into the locking pin fixing groove.

The inner plate 200 accommodates a pair of the locking pins 100 on the inner side thereof in a state in which the locking pins 100 face each other on the same line. However, this structural configuration is only one embodiment, and in some cases, a single locking pin 100 may be provided, or one or more pairs of locking pins 100 may be provided.

When plural locking pins are provided, the inner plate may be more firmly fixed to the outer plate.

In this manner, one end of the locking pin 100 may be inserted into the locking pin fixing groove 310 formed in the outer plate 300, or one end of the locking pin 100 may be separated from the locking pin fixing groove 310.

Figure 6:
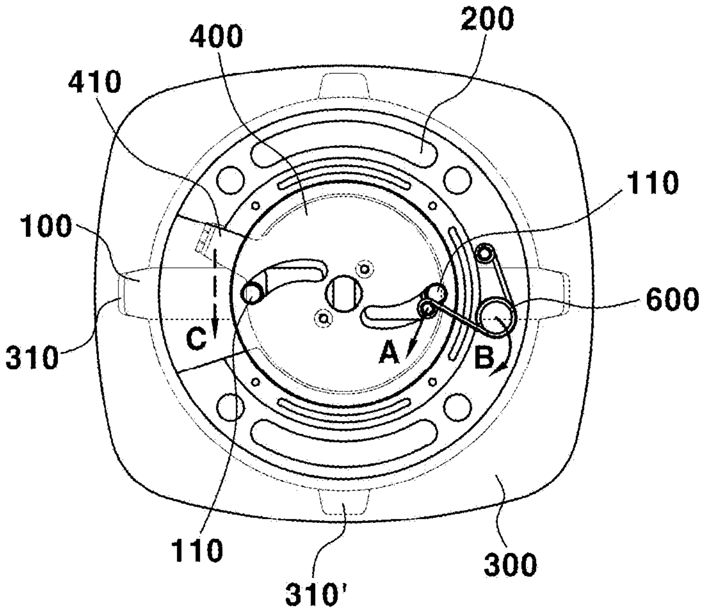
FIGS. 6 and 7 are diagrams each showing a result of observing, from above, a state in which one end of the locking pin is separated from a locking pin fixing groove and is inserted into another locking pin fixing groove.
Figure 7:
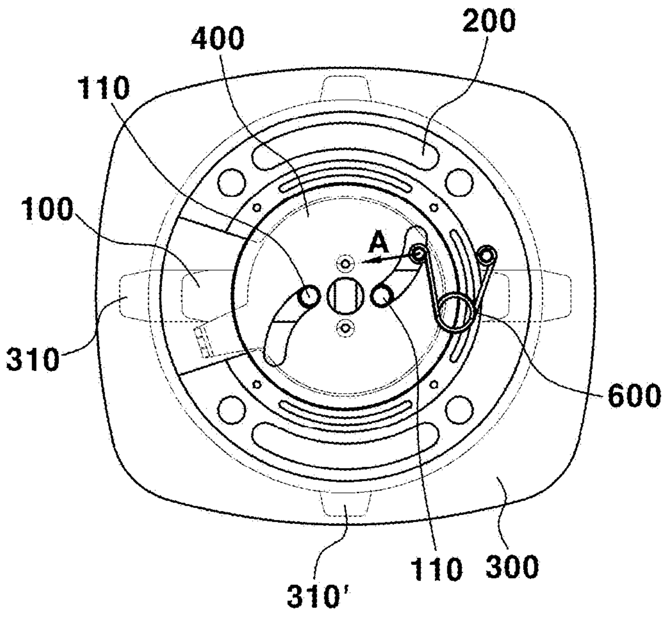

The outer plate 300 has an inner plate accommodating space 320 formed therein and configured to accommodate the inner plate 200 therein, thereby accommodating the inner plate 200 in the outer plate 300. As shown in FIG. 6, when one end of the locking pin 100 accommodated in the inner plate 200 is inserted into the locking pin fixing groove 310 of the outer plate 300, rotation of the inner plate 200 becomes impossible. Meanwhile, as shown in FIG. 7, when one end of the locking pin 100 is separated from the locking pin fixing groove 310 of the outer plate 300, the inner plate 200 is rotatable within the outer plate 300 and, as such, the inner plate 200 accommodated in the outer plate is rotatable.

One end of the locking pin accommodated in the inner plate 200 is repeatedly inserted into and separated from the outer plate 300. Further, the outer plate 300 has the locking pin fixing groove 310 configured to allow one end of the locking pin 100 to be inserted thereinto and fixed thereto, and the inner plate repeats rotation thereof in the outer plate. Accordingly, the outer plate 300 preferably secures at least the same rigidity as that of the inner plate 200 or the locking pin 100. More preferably, the outer plate secures stronger rigidity than that of the inner plate 200 or the locking pin 100.

As described above, a device adapted to rotate the seat may be manufactured in compact size by accommodating the locking pin 100 in the inner plate 200 and accommodating the inner plate 200 in the outer plate 300. In addition, since the device is made of a material capable of securing sufficient rigidity, it is possible to reduce risk of damage even if vehicle collision occurs on the outside of the vehicle.

Additionally, since the locking pin 100 is strongly fixed to the outer plate 300, it is possible to prevent a coupled component from being separated from the device due to vibration that occurs while a vehicle is travelling, or to prevent the vibration from being transmitted to the seat, thereby making it possible to provide comfortable driving.

Figure 8:
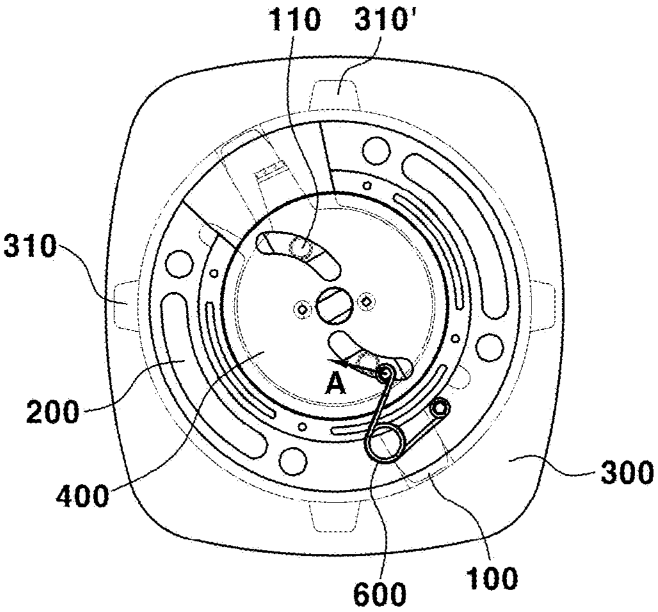
FIGS. 8 and 9 are diagrams each showing a result of observing, from above, a state in which one end of the locking pin is inserted into another locking pin fixing groove.

As shown in FIGS. 6 to 8, the locking pin fixing grooves 310 and 310' may be formed at equal intervals along the circumference of the outer plate 300. When a user attempts to rotate the seat S coupled to the inner plate 200, one end of the locking pin 100 may be separated from the locking pin fixing groove 310 so that the seat S becomes rotatable. When the seat S is rotated, the inner plate 200 is rotated, and then the locking pin 100 is inserted into the locking pin fixing groove 310' which is different from the locking pin fixing groove 310 into which the locking pin 100 has been previously inserted. In this manner, rotation of the seat S may be completed while the inner plate 200 is fixed.

Particularly, the locking pin fixing grooves 310 are formed along the circumference of the outer plate 300, and a distance between the locking pin fixing grooves 310 each configured to allow the locking pin 100 to be inserted thereinto is not sufficiently large in the counterclockwise and clockwise directions. Accordingly, even if impact is applied to the vehicle body from any direction, the inner plate 200 may be stably fixed to the outer plate.

Additionally, when a plurality of locking pin fixing grooves 310 are formed in the outer plate 300, the seat may be rotatable so as to achieve desired viewing angles. In the drawing, four locking pin fixing grooves 310 are shown, and the seat is rotatable by 90 degrees. Meanwhile, four or more locking pin fixing grooves 310 may be provided so as to rotate the seat by a smaller angle than 90 degrees.

As described above, a brief description has been given as to the operation sequence of the vehicular seat according to the embodiment of the present disclosure. Hereinafter, a specific operation sequence will be described.

First, in order to put the seat S in the rotatable state, one end of the locking pin 100 is separated from the locking pin fixing groove 310.

FIGS. 6 and 7 are diagrams each showing a result of observing, from above, a state in which one end of the locking pin 100 is separated from the locking pin fixing groove 310. Referring to FIGS. 6 and 7, one end of the locking pin 100 may be separated from the locking pin fixing groove 310 by release force C applied to a lever plate 400 to be described later. Accordingly, the inner plate 200 enters the rotatable state.

Here, the release force C refers to external force applied to the lever plate 400 by a user or another device.

Specifically, referring to FIGS. 4 and 5, the locking pin 100 has a first guide protrusion 110 formed on one surface thereof and formed to protrude outwards from the inner plate 200. Further, a locking pin bracket 500 has a slot hole 510 formed therein and configured to enable the first guide protrusion 110 of the locking pin 100 to be movable therein. Here, the locking pin bracket 500 may be accommodated in a locking pin bracket accommodation groove 230 formed on the outer side of the inner plate 200. One surface of the licking pin 100 may be a surface facing the seat S. The locking pin bracket 500 is a component configured to induce movement of the locking pin 100 through the slot hole 510 formed therein and rotation thereof and is a necessary component to separate the locking pin 100 inserted into the locking pin fixing groove 310 from the locking pin fixing groove 310.

The locking pin 100 is coupled to the locking pin bracket 500 so that the first guide protrusion 110 is accommodated in the slot hole 510 formed in the locking pin bracket 500. Accordingly, when the locking pin bracket 500 is rotated, the first guide protrusion 110 is moved in the slot hole 510, thereby enabling linear reciprocating motion of the locking pin 100. In this case, a pair of slot holes 510 is formed in a streamlined shape, thereby enabling linear reciprocating motion of the locking pin 100 according to rotation of the locking pin bracket 500.

The slot hole 510 is preferably formed to be wider than the width of the first guide protrusion 110 so as to enable the first guide protrusion 110 to be smoothly movable in the slot hole 510, and the first guide protrusion 110 preferably has an appropriate height so as to be smoothly accommodated in the slot hole 510.

Meanwhile, referring to FIGS. 1 and 2, rotation of the locking pin bracket 500 is performed by the lever plate 400 connected to the locking pin bracket 500 and the inner plate 200. The lever plate 400 has a lever 410 formed at one end thereof and configured to allow release force to be applied thereto. That is, release force is applied to the lever 410 so as to rotate the lever plate 400.

The lever plate 400 is connected to the locking pin bracket 500, and the locking pin bracket 500 is also rotated by rotation of the lever plate 400. When the first guide protrusion 110 accommodated in the locking pin bracket 500 is moved along the slot hole 510, linear motion of the locking pin 100 may be induced.

More specifically, a connection relationship between the locking pin bracket 500, the lever plate 400, and the inner plate 200 will be described.

The lever plate 400 is coupled to the locking pin bracket 500. A first coupling hole 520 is formed in the locking pin bracket 500, and a second coupling hole 420 is formed in the lever plate 400 at a position corresponding to the first coupling hole 520. Then, a connector L is inserted into the first coupling hole 520 and the second coupling hole 420 so as to connect the locking pin bracket 500 to the lever plate 400. In this manner, force applied to the lever plate 400 may also be transmitted to the locking pin bracket 500.

Since the connector L connects the locking pin bracket 500 to the lever plate 400, the connector L is required to have sufficient rigidity. Further, the connector L is desirably formed to have a sufficient length so as to completely penetrate the lever plate 400 and locking pin bracket 500.

Additionally, referring to FIG. 2, the lever plate 400 and the inner plate 200 are connected to each other through a torsion spring 600. The lever plate 400 has a spring coupling protrusion 430 formed on one surface thereof, and the inner plate 200 has a spring coupling protrusion 240 formed on one surface thereof. Here, the torsion spring 600 is coupled to the spring coupling protrusions 430 and 240. Specifically, one end and the other end of the torsion spring 600 are respectively coupled to the spring coupling protrusions 430 and 240, thereby connecting the lever plate 400 to the inner plate 200. One surface of the lever plate 400 may be a surface facing the seat S.

The torsion spring 600 applies force to the inner plate 200 or the lever plate 400 depending on the relative positions of the inner plate 200 and the lever plate 400. That is, the lever plate 400 and the inner plate 200 are rotatably provided, and the torsion spring 600 connecting the lever plate 400 to the inner plate 200 also changes the position thereof depending on rotation of the lever plate 400 and the inner plate 200 (refer to an arrow B shown in FIG. 6).

Therefore, when the position of the torsion spring 600 is changed, a direction of force acting on the lever plate 400 and the locking pin bracket 500 is also changed, and force acts on the locking pin 100 in the inward or outward direction of the inner plate 200. Accordingly, the locking pin 100 is capable of performing linear reciprocating motion within the inner plate 200.

FIGS. 6 to 9 are diagrams each showing a force direction A of the torsion spring.

Hereinafter, a specific direction of force applied to the locking pin 100 and the like will be described according to the operation sequence of the rotating seat according to the present disclosure.

First, a description will be given as to a process in which one end of the locking pin 100 is separated from the locking pin fixing groove 310 according to the above-described connection relationship. Referring to FIGS. 6 and 7, FIG. 6 is a diagram showing a state in which the locking pin 100 receives force in the outward direction of the inner plate such that one end of the locking pin 100 moves to the locking pin fixing groove 310 by force generated from the torsion spring 600.

That is, the torsion spring 600 applies force in a clockwise direction, and the lever plate 400 and the locking pin bracket 500 connected thereto receive the force applied in the clockwise direction. Accordingly, the locking pin 100 receives force in the outward direction of the inner plate 200.

At this time, in order to rotate the seat S, when release force (exceeding force generated from the torsion spring) is applied to the lever plate 400 in the counterclockwise direction so as to rotate the lever plate 400 in the counterclockwise direction, the locking pin bracket 500 connected to the lever plate 400 is also rotated.

That is, since release force applied to the lever plate 400 is stronger than force generated from the torsion spring 600, one end of the locking pin 100 receives force in a direction away from the locking pin fixing groove 310, that is, in the inward direction of the inner plate 200.

As a result, the first guide protrusion 110 of the locking pin 100 is moved toward the rotation center of the locking pin bracket 500 along the slot hole 510, and one end of the locking pin 100 is separated from the locking pin fixing groove 310, thereby entering the state shown in FIG. 7.

Additionally, referring to FIGS. 6 and 7, when one end of the locking pin 100 is completely separated from the locking pin fixing groove 310, the position of the torsion spring 600 is also rotatably changed by rotation of the lever plate 400. When the position of the torsion spring 600 is rotatably changed, force applied from the torsion spring 600 to the lever plate 400 and the locking pin bracket 500 acts in the counterclockwise direction.

That is, as shown in FIG. 6, before the lever plate 400 is rotated, force of the torsion spring 600 acts in the clockwise direction, but when the lever plate 400 is rotated, force of the torsion spring 600 acts in the counterclockwise direction, as shown in FIG. 7, and the lever plate 400 and the locking pin bracket 500 connected thereto receive force in the counterclockwise direction. As a result, the locking pin 100 receives force urging the locking pin 100 to move to the inner side of the inner plate 200.

As described above, when one end of the locking pin 100 is separated from the locking pin fixing groove 310 by applying release force to the lever plate 400, the seat S coupled to the inner plate 200 may be in the rotatable state. In this state, when rotational force is applied to the seat S so as to rotate the seat S, the inner plate 200 connected to the seat S may be rotated.

Here, rotational force refers to external force applied to the seat by a user to rotate the seat.

Figure 9:
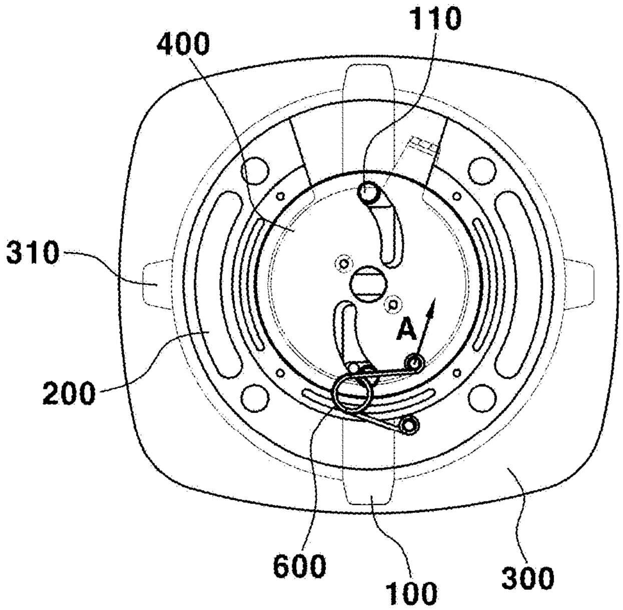
Figure 10:
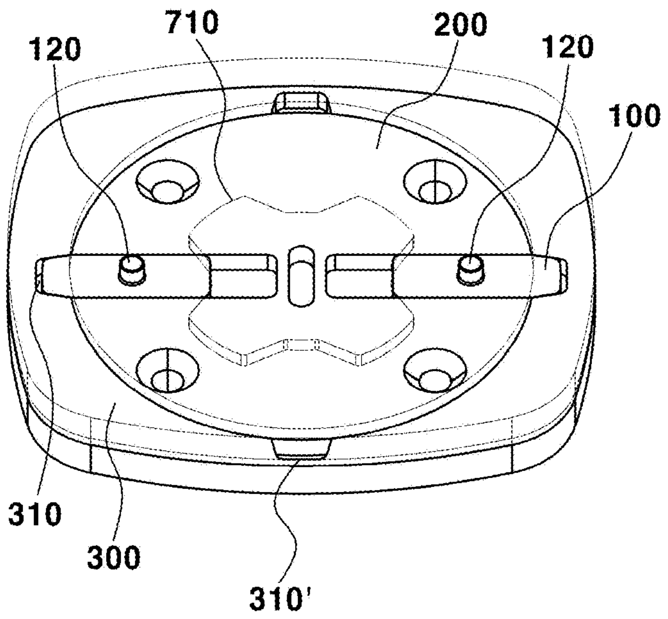
FIGS. 10 to 15 are diagrams each showing a result of observing, from below, an operation sequence of the rotating seat.
Figure 11:
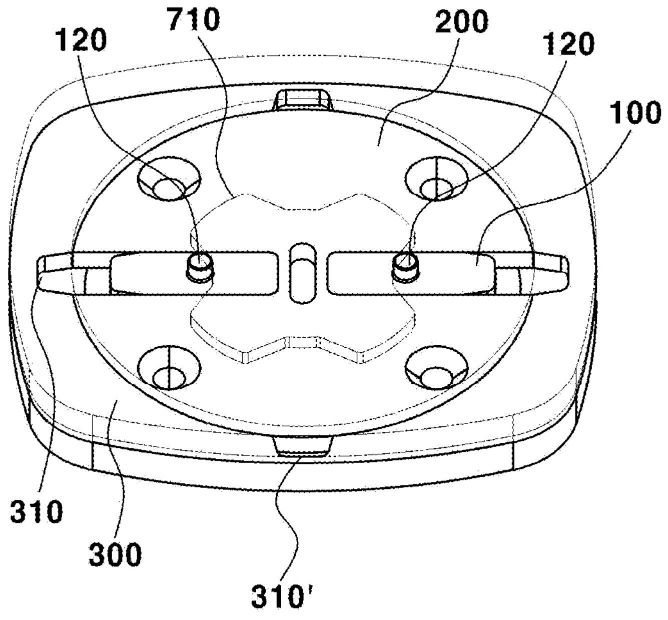

That is, the seat may be rotatable in the state shown in FIG. 7, and rotation of the seat may be completed by going through the states shown in FIGS. 8 and 9. When the inner plate 200 is rotated by rotation of the seat, the locking pin 100 accommodated in the inner plate 200 may be inserted into any one of the plurality of locking pin fixing grooves 310. When the locking pin 100 is inserted into any one of the plurality of locking pin fixing grooves 310 without release force applied to the lever plate 400, the inner plate 200 may be fixed.

Next, the inner plate 200 is rotated by rotation of the seat S, and the locking pin 100 is inserted into another locking pin fixing groove 310', thereby completing rotation of the seat S.

Referring to FIGS. 4 and 5, a second guide protrusion 120 protruding downwards is formed on the lower surface of the locking pin 100. Referring to FIG. 1, a base plate 700 is provided below the inner plate 200, in which the base plate 700 has a guide portion 710 formed thereon and configured to contact the second guide protrusion 120 so as to move the second guide protrusion 120.

In a state in which one end of the locking pin 100 is separated from the locking pin fixing groove 310, when the seat S is rotated clockwise or counterclockwise, the guide portion 710 formed on the base plate 700 may push the second guide protrusion 120 in a direction of force applied to the seat S and may apply force directed outwards from the inner plate 200 to the locking pin 100.

FIGS. 10 to 15 are diagrams each showing a result of observing, from below, the operation sequence of the rotating seat. First, referring to FIGS. 10 and 11, the locking pin 100 is separated from the locking pin fixing groove 310 by release force applied to the lever plate 400. Thereafter, the second guide protrusion 120 contacts the outer peripheral surface of the guide portion 710 formed on the base plate 700.

Thereafter, when rotational force is applied to the seat S, rotational force is transmitted to the inner plate 200, and force is also transmitted to the locking pin 100 accommodated in the inner plate 200. Referring to FIGS. 10 to 13, a direction in which the locking pin 100 is moved is determined by force transmitted to the locking pin 100 by rotation of the seat S. Further, the second guide protrusion 120 of the locking pin 100 is continuously moved in a direction in which the locking pin 100 is moved by reaction force generated on the outer peripheral surface of the guide portion 710 until the second guide protrusion 120 is separated from the outer peripheral surface of the guide portion 710.

Figure 16:
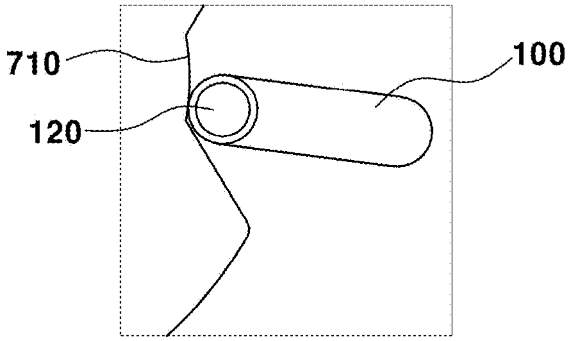
FIGS. 16 to 18 are diagrams each showing a state in which a second guide protrusion of the locking pin is moved by an outer peripheral surface shape of a guide portion.
Figure 17:
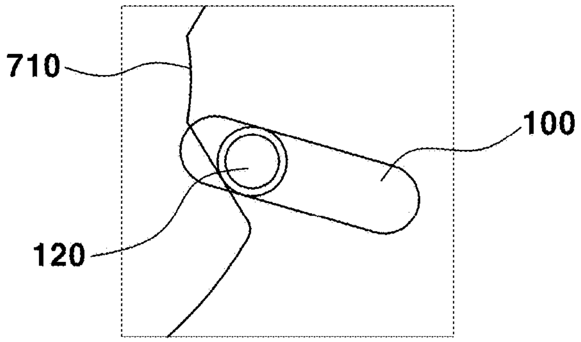
Figure 18:
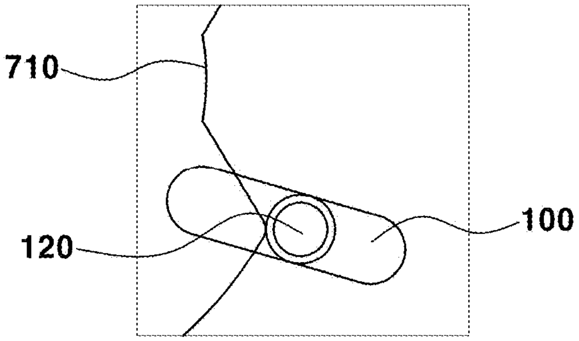

FIGS. 16 to 18 are diagrams each showing that the second guide protrusion 120 of the locking pin 100 is moved by the shape of the outer peripheral surface of the guide portion 710. Referring to FIGS. 16 to 18, the second guide protrusion 120 of the locking pin 100 is continuously moved by the shape of the outer peripheral surface of the guide portion 710 until the second guide protrusion 120 is separated from the outer peripheral surface of the guide portion 710.

Force directed outwards from the inner plate 200 is applied to the locking pin 100 due to reaction force from the guide portion 710. Particularly, the outer peripheral surface of the guide portion 710 is formed to have a shape adapted to push the second guide protrusion 120, and reaction force is applied to the second guide protrusion 120 by the guide portion 710. As a result, force directed outwards from the inner plate 200 may be applied to the locking pin 100.

Figure 12:
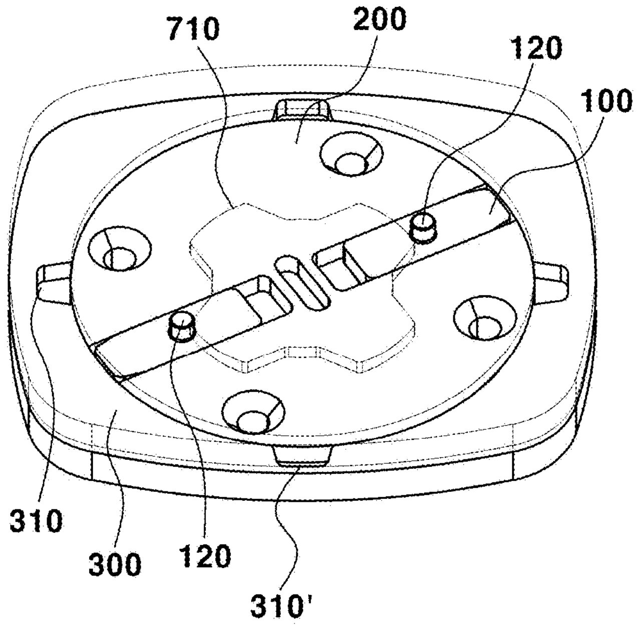
Figure 13:
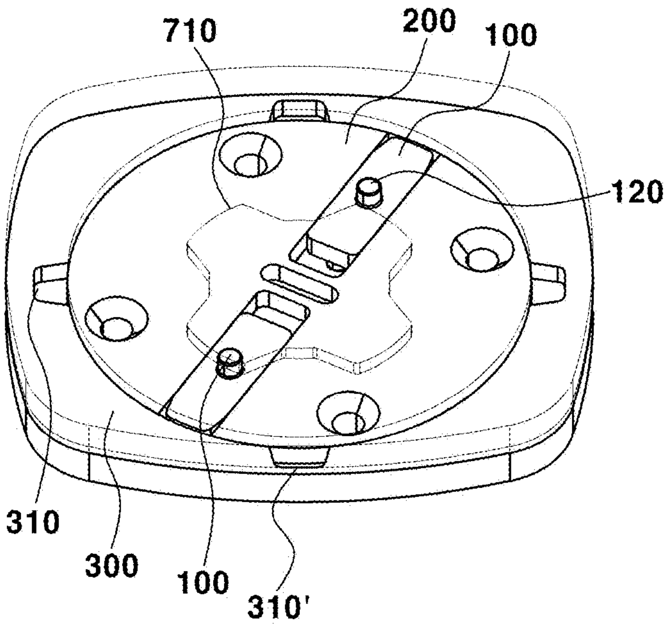
Figure 14:
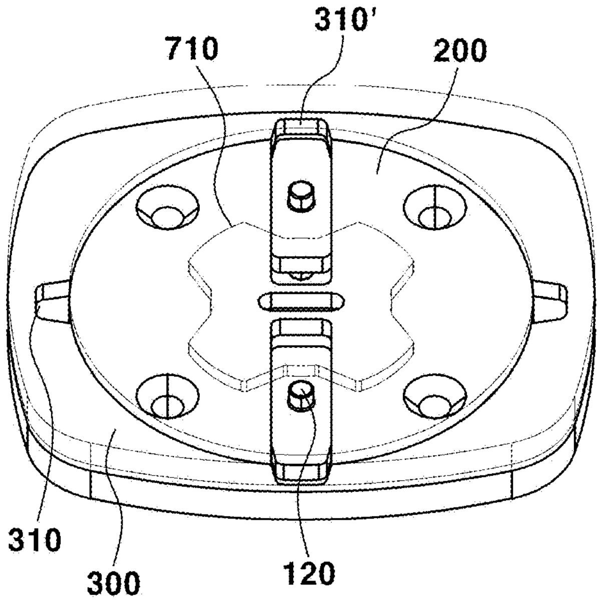
Figure 15:
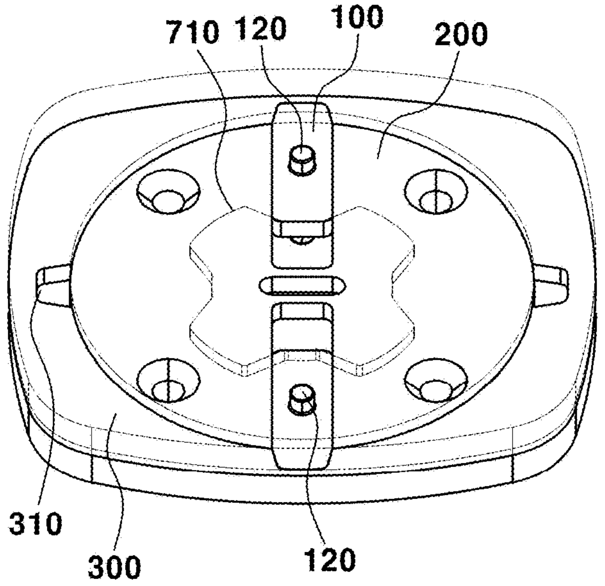

Thereafter, when the second guide protrusion 120 and the outer peripheral surface of the guide portion 710 are separated from each other in the state shown in FIG. 12, one end of the locking pin 100 is inserted into the locking pin fixing groove 310', which is different from the locking pin fixing groove 310 into which one end of the locking pin 100 has been previously inserted by continuous rotational force of the inner plate 200 and force acting on the locking pin 100 in the outward direction of the inner plate 200 (refer to FIG. 7). Thereafter, the locking pin 100 is coupled to the outer plate 300, and rotation of the inner plate 200 is stopped, thereby completing rotation of the seat S.

As is apparent from the above description, the present disclosure provides a rotating seat having advantages in that it is possible to rotate a vehicle seat, and a device capable of rotating the vehicle seat is simple and compact in size.

Particularly, a user may easily control a locked state of the rotating seat and an unlocked state thereof, and coupling rigidity between the rotating seat and a vehicle body may be stably maintained in the locked state, thereby making it possible to maximally secure the safety of a passenger in the event of vehicle collision.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and equivalents thereto.

What is claimed is:

1. A rotating seat comprising:

locking pins each arranged to extend in a longitudinal direction thereof;

an inner plate configured to be coupled to a rotatable seat and to accommodate the locking pins therein; and an outer plate configured to rotatably accommodate the inner plate, the outer plate comprising a plurality of locking pin fixing grooves, one end of each of the locking pins configured to be inserted into a corresponding one of the locking pin fixing grooves, wherein the inner plate is configured to enter a rotatable state when the one end of each of the locking pins is separated from the corresponding one of the locking pin fixing grooves.

2. The rotating seat of claim 1, wherein the inner plate includes a pair of the locking pins accommodated on an inner side thereof and disposed to face each other on the same line.

3. The rotating seat of claim 1, wherein each of the locking pins includes a first guide protrusion provided on one surface thereof and formed to protrude outwards from the inner plate, wherein the rotating seat further comprises a locking pin bracket including slot holes formed therein, each of the slot holes allowing a corresponding one of the first guide protrusions of the locking pins to be movably accommodated therein, and wherein the inner plate includes a locking pin bracket accommodation groove formed therein and configured to accommodate the locking pin bracket therein.

4. The rotating seat of claim 3, wherein the locking pin bracket includes a lever plate provided at an upper portion thereof, and the lever plate is connected to the locking pin bracket and the inner plate and is configured to separate, by release force applied thereto, the one end of each of the locking pins from the corresponding one of the locking pin fixing grooves.

5. The rotating seat of claim 4, wherein the first guide protrusion of each of the locking pins is moved, when the lever plate is rotated by the release force, toward a center of the locking pin bracket along a corresponding one of the slot holes, thereby causing the one end of each of the locking pins to be separated from the corresponding one of the locking pin fixing grooves.

6. The rotating seat of claim 4, wherein the rotatable seat coupled to the inner plate is configured to enter a rotatable state when the one end of each of the locking pins is separated from the corresponding one of the locking pin fixing grooves by the release force applied to the lever plate.

7. The rotating seat of claim 6, wherein the inner plate is configured to be fixed when the inner plate is rotated by rotation of the rotatable seat such that any one of the locking pins accommodated in the inner plate is inserted into the corresponding one of the plurality of locking pin fixing grooves.

8. The rotating seat of claim 4, wherein one surface of the lever plate and one surface of the inner plate are connected to each other through a torsion spring.

9. The rotating seat of claim 4, wherein:

the locking pin bracket includes a first coupling hole formed therein, the lever plate includes a second coupling hole formed therein at a position corresponding to the first coupling hole, and the locking pin bracket and the lever plate are configured to be rotated together by a connector inserted into the first coupling hole and the second coupling hole.

10. The rotating seat of claim 4, wherein the lever plate and the inner plate are connected to each other through a torsion spring, the locking pin bracket is connected to the inner plate, a position of the torsion spring varies depending on rotation of the lever plate and the inner plate, and a direction of force acting on each of the locking pins is changed depending on the position of the torsion spring.

11. The rotating seat of claim 3, wherein a pair of the slot holes is formed in a streamlined shape.

12. The rotating seat of claim 1, wherein each of the locking pins includes a second guide protrusion provided on a lower surface thereof and formed to protrude downwards from the lower surface, the inner plate includes a base plate provided at a lower portion thereof, and the base plate includes a guide portion formed thereon and configured to contact and move the second guide protrusion.

13. The rotating seat of claim 12, wherein the second guide protrusion is moved along an outer peripheral surface of the guide portion when rotational force is applied to the rotatable seat after the one end of each of the locking pins is separated from the corresponding one of the locking pin fixing grooves.

14. The rotating seat of claim 1, wherein the inner plate includes locking pin accommodation grooves formed therein and configured to allow the locking pins to be accommodated in the inner plate, and each of the locking pin accommodation grooves serves as a reciprocating motion path of a corresponding one of the locking pins.

15. The rotating seat of claim 1, wherein the outer plate includes an inner plate accommodation space formed therein and configured to accommodate the inner plate therein.

16. The rotating seat of claim 1, wherein the locking pin fixing grooves are formed at equal intervals along a circumference of the outer plate.

* * * * *